Dec. 9, 1952

H. O. McMAHON 2,620,573

LOW-PRESSURE PRODUCT DRYING

Filed Jan. 28, 1948

HOWARD O. McMAHON
INVENTOR.

BY George S. Evans
ATTORNEY

Dec. 9, 1952 H. O. McMAHON 2,620,573
LOW-PRESSURE PRODUCT DRYING
Filed Jan. 28, 1948 2 SHEETS—SHEET 2
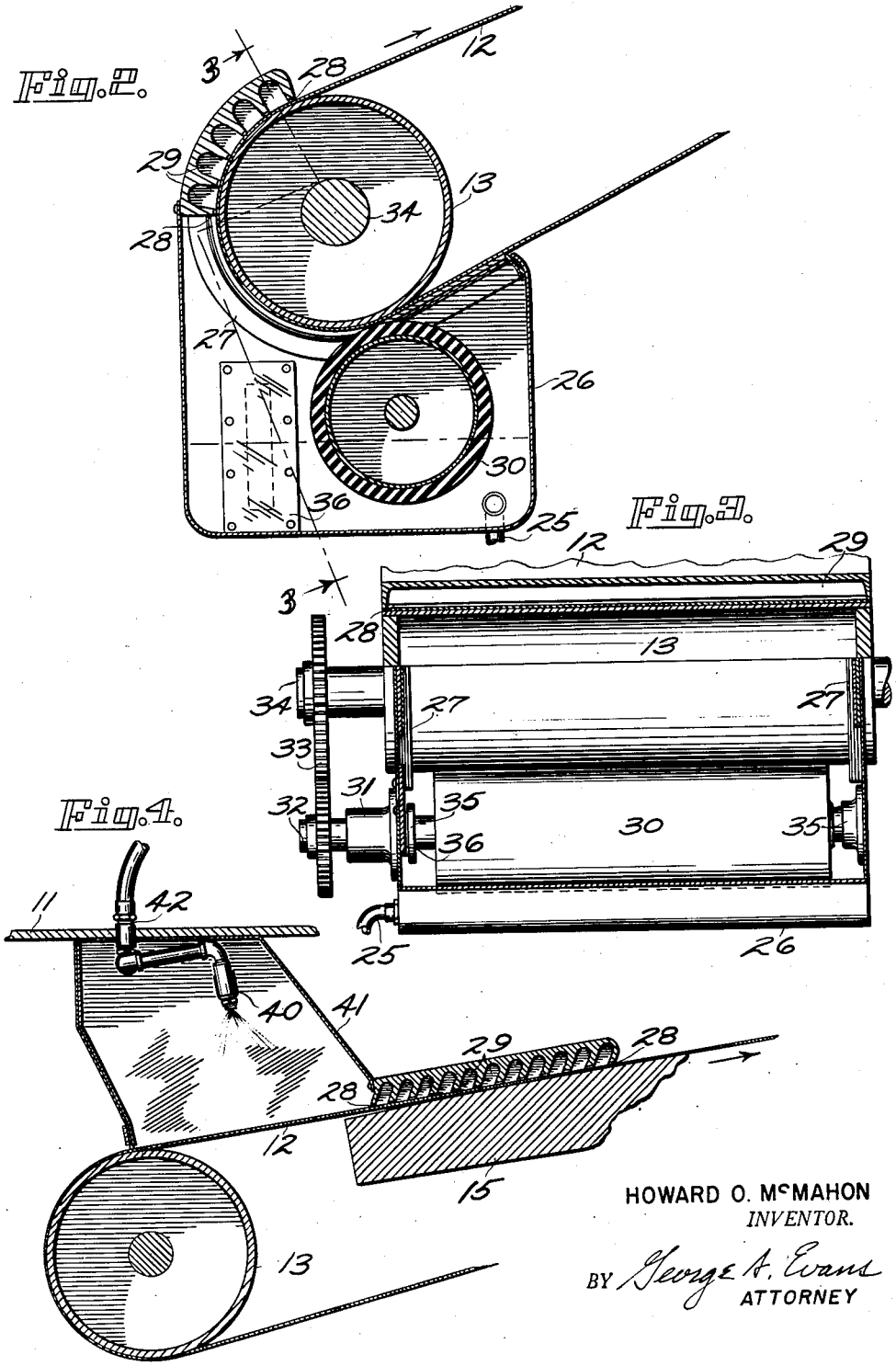
HOWARD O. McMAHON
INVENTOR.
BY George A. Evans
ATTORNEY Patented Dec. 9, 1952

2,620,573

UNITED STATES PATENT OFFICE 2,620,573

LOW-PRESSURE PRODUCT DRYING

Howard O. McMahon, Lexington, Mass., assignor to Arthur D. Little, Inc., Cambridge, Mass., a corporation of Massachusetts Application January 28, 1948, Serial No. 4,920

7 Claims. (Cl. 34—5)

This invention relates to the dehydration of liquid or semi-liquid materials under conditions of vacuum normally so high that some of the constituent water in the material will become frozen, and the evaporation thereof may proceed directly from the frozen state.

Freeze-drying, which is a name commonly applied to this form of dehydration, has many advantages, most notable of which is the ability of the material being dried to retain its original properties such as vitamins and flavor, in the case of food products, as well as the ease with which it may be reconstituted upon the addition of water.

For freeze-drying to proceed, it is necessary that the total pressure in the vacuum chamber, i. e. the pressure of the water vapor liberated from the material and the residual gas pressure after evacuation be less than that corresponding to the freezing point of the material undergoing dehydration. In the case of pure water, maintenance of a total pressure of less than 4.5 mm. Hg absolute, is required to produce freezing, and for materials having a lower freezing point than water, a correspondingly lower pressure must be maintained.

Heretofore attempts have been made to dry materials from the frozen state by continuous means, for instance while the material is on a moving conveyer such as a drum, an endless belt or the like. If the material is introduced into the vacuum chamber in unfrozen condition, applying it to the conveyer means has involved considerable difficulties, principally on account of the rapidity with which the water content of the material freezes and becomes unmanageable, either clogging the orifice of the introduction means or adhering to surfaces in the chamber where such adherence is undesirable.

Direct spraying of the liquid material on such a conveyer, in which the spray characteristics of the liquid are controlled so that a liquid film is formed on the conveyer prior to freezing, appears to be the most practical method of application heretofore proposed, but in this method there is an undesirable loss of product occasioned by spindrift, which causes some of the spray to veer to the side and miss its object, and also because some of the liquid material bounces or spatters off the conveyer and lodges on other surfaces.

According to the present invention, the material to be dried is introduced into the vacuum chamber as a liquid, and is applied to the conveyer in this form. This is accomplished by enclosing the portion of the conveyer on which the material is initially applied, and maintaining within the enclosure a vacuum which is sufficient to produce considerable cooling of the material by evaporation of some of its water content. the vacuum being insufficient however to cause freezing of the material. The water vapor evolved from the material in the enclosure is removed at a rate such that an equilibrium pressure condition is maintained within the enclosure during the constant application of the material to the moving conveyer means. As soon as the conveyer leaves the enclosure, the freezing of the liquid which has been disposed as a film thereon may occur, and drying of material upon the application of heat and the maintenance of vacuum conditions proceeds in an efficient manner.

The invention may be carried out by various means, several of which will be hereinafter described in detail. It will be noted however that the objects of the invention are accomplished without limitation to specific means, said objects including:

The provision of applicator means for a continuous freeze-drier in which the drying may proceed in a more efficient manner.

The elimination of the loss of ultimate product because of the lodging of the material on undesirable surfaces and becoming contaminated or unrecoverable in a practical manner.

Freedom from interruption in operation of the drying apparatus because of clogging of the material introduction means or irregular performance of the same.

Specific embodiments of the invention are illustrated in the accompanying drawings wherein:

Fig. 2 is an enlarged side elevation of the apparatus shown in Fig. 1;

Fig. 3 is a section taken on the line 3—3 of Fig. 2; and

Fig. 4 is a side elevation of a modified form of apparatus.

Figure 1:
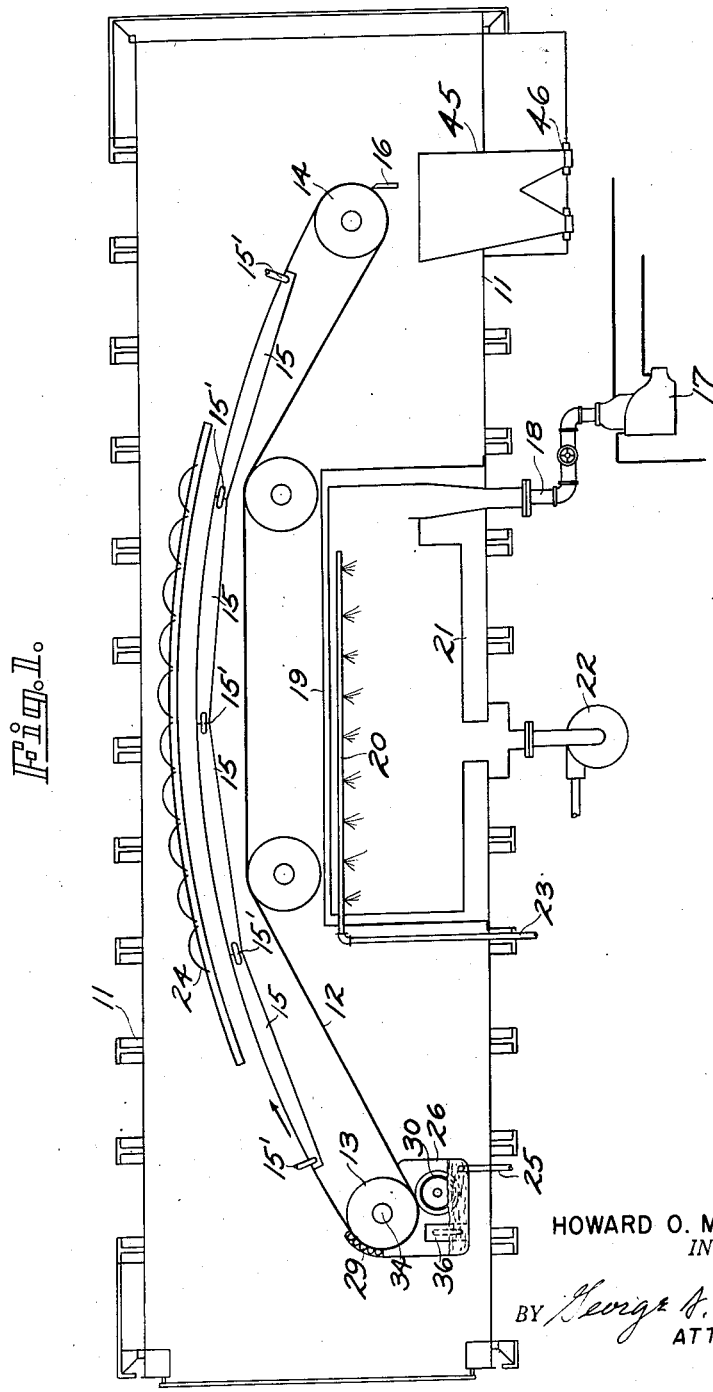
Fig. 1 is a diagrammatic view of the side elevation of apparatus suitable for carrying out the present invention.

The materials that may be dried in the manner hereinafter described cover a wide range of substances such as fruit juices, milk, coffee extract, eggs and similar food products as well as sera and other biologically active substances. On account of the different characteristics of these different substances and variations in their solid contents, the drying techniques to be employed will not be the same for all products, but the principles to be observed in regard to the present invention may be considered the same.

Referring to Fig. 1, the vacuum chamber 11 is sufficiently large to accommodate an endless belt 12 trained over pulleys 13 and 14 disposed adjacent each end of the chamber. The drying portion of the belt 12 rides on heated platens 15, the temperature of which is carefully controlled in relation to the speed of the belt so that when the belt reaches the pulley 14 the product thereon will be thoroughly dried and can be removed by the doctor blade 16. The platens 15 may be heated in any suitable manner, for instance by circulating heated water therethrough, suitable pipes 15' conducting such water to and from the platens.

The vacuum chamber is initially evacuated by a vacuum pump 17, the pipe 18 which leads to the vacuum pump communicating with the vacuum chamber 11 through a portion of the latter in which there is arranged a contact condenser 19 for the water vapor given off by the material. The contact condenser 19 which may be conveniently disposed directly beneath the belt conveyer may consist of a header pipe 20 from which a spray of a concentrated refrigerated brine falls on the gas being drawn to the vacuum pump 17. The falling brine is collected in a pan 21 and contains the condensed water vapor given off from the material. The now somewhat diluted brine is pumped from the chamber by the pump 22, and may be reconstituted (i. e. re-concentrated and re-refrigerated) prior to its reintroduction through the pipe 23 which leads to the header 20. The contact condenser forms no part of this invention, but must utilize a cooling medium that under the conditions existing in the vacuum chamber will not yield water vapor thereto.

The rate of drying of the material on the endless belt may be augmented by the provision of radiant heating means 24 disposed above the belt and opposite to the platens.

The material to be dried is introduced in liquid form through the pipe 25 which enters the enclosure 26. This enclosure which is best illustrated in Figs. 2 and 3, is disposed adjacent the underside of the belt beneath one of the end pulleys of the conveyer and is of a width substantially the same as the belt 12. Rubber seals 27 are arranged to extend from all but one edge of the perimetral portions of the enclosure and by contacting the belt 11 they seal the enclosure from the rest of the inside of the vacuum chamber. The edge of the enclosure which is not provided with a rubber seal has a series of orifices 28 of progressively smaller clearance with respect to the belt as it passes over the head pulley 13. Between these orifices are surge chambers 29 the purpose of which will be hereinafter described.

The liquid material that it is intended to dry is permitted to collect in the bottom of the enclosure until it reaches the level indicated by the dotted line shown in Figs. 1 and 2. A roller 30 preferably having a rubber coating dips into the liquid in the enclosure and on rotation applies it to the outer surface of the conveyer belt. The roller 30 of course is journalled in suitable bearings 31 mounted in the chamber and is preferably power driven as by the gears 32 and 33 which derive their power from the shaft 34 on which the head pulley 13 is mounted. The portions of the shaft on which the roller is mounted, which extend through the sides of the enclosure, are provided with rotary seals 35 as illustrated in Fig. 3. A sight glass 36 on one side of the enclosure permits observation of the level of the liquid within the enclosure and the control of the rate of feed of incoming liquid to maintain the same.

At the start of operations the vacuum chamber 11 is evacuated to the desired ultimate operating pressure. Because of the communication between the enclosure 26 and the vacuum chamber adjacent the outer edge of the belt, the enclosure will be simultaneously evacuated to the same extent. Next the material to be dried is fed through the pipe 25 in the enclosure until the desired level thereof is obtained. The roller applicator 30 is then set in operation and as the belt 12 moves, the roller supplies a film of liquid material to the belt which progresses past the end pulley 13 and over the heated zone between the platens 15 and the source of radiant heat 24.

Freezing of the material which occurs as the belt emerges from the last orifice 28 confining the opening to the enclosure is prevented within the enclosure by the evolution of water vapor in the enclosure caused by the low pressure prevailing in the enclosure at the time the material is first introduced in the enclosure. This water vapor escapes from the enclosure through the series of orifices previously described but its rate of escape is controlled by the shape of the metering orifices so that an equilibrium pressure condition is maintained within the enclosure which is just slightly above that corresponding to the pressure at which the material would otherwise freeze.

As previously stated, the actual pressure within the vacuum chamber and that within the enclosure will vary with different materials and different operating conditions. It has been found that a pressure within the enclosure of the order of 6 mm. Hg absolute is a suitable and practical pressure to maintain where the pressure within the vacuum chamber is of the order of one mm. Hg absolute.

The various orifices 28 which are arranged in series provide a rate of flow of vapor from the interior of the enclosure such that the necessary pressure drop is obtained; the actual pressure drop which the metering orifices effect will vary with the temperature of the material being introduced, its latent heat of vaporization and the width of the slots which the orifices provide. The clearances must be relatively small, for the vacuum is so high that the velocity through the orifices is exceedingly great, and hence a pressure drop is not easily obtained. The pockets 29 which are provided between the orifices constitute chambers in which turbulence of the escaping gas may be created, thereby building up pressure in back of each of the orifices, and each of the orifices will therefore create a part of the total pressure drop.

In Fig. 4 a modified form of apparatus is disclosed in which instead of applying the material to the belt by a roller, one or more spray nozzles 40 are arranged to extend through the enclosure 41 and spray the material introduced through the pipe 42 directly on the moving belt 12 of the belt conveyer. Whatever bounces off the belt or impinges on the side of the enclosure 41 flows on the side of the enclosure and hence onto the belt since the material is still in liquid form. All of the other parts of the apparatus shown in Fig. 4 are the same as those shown in Fig. 1 and a description thereof need not be repeated, like numbers on the drawings in both views referring to like parts.

Referring again to Fig. 1, the finally dried product is a powder which may contain as little as 1% moisture, and is removed by the doctor blade 16, to be collected in a hopper 45 disposed beneath the doctor blade, then passing through a series of locks 46 of a type well known in the art. The product may be removed from the chamber without interfering with the vacuum conditions existing in the chamber. Thus drying may proceed in a continuous manner and a high output of dried product is obtained.

The belt upon which the material is dried may be of any suitable material, either organic or inorganic. Thus it may consist of nylon or a suitably plasticized and heat-and-cold resistant plastic, or it may be a metal such as stainless steel, Monel metal or aluminum. The brine employed as a contact condenser may be a concentrated lithium chloride solution. Automatic level devices may be employed to maintain the liquid level in the chamber 26 at the desired point, thus automatically adjusting the feed. Suitable manometers to indicate the pressure in the chambers 11 and 26 may be provided to enable more accurate observation of the operation, and suitably positioned thermometers can be employed for a similar purpose.

Different modifications within the skill of those conversant with this art are to be construed as within the purview of the invention.

What is claimed is:

1. Apparatus for drying liquid materials comprising a vacuum chamber, moving conveying-means disposed within said chamber, means for evacuating said vacuum chamber to a pressure at which auto-refrigerant freezing of the material occurs, means for supplying heat to material on said conveying-means to cause drying thereof, an enclosure confining a portion of the conveying-means, means for applying material to the conveying-means within said enclosure, said enclosure communicating with the vacuum chamber by a series of restricted openings of progressively smaller clearance through which the material applied on the conveying-means may pass together with sufficient water vapor evolved during the application of the material to the conveying-means to maintain within the enclosure a substantially constant, vapor pressure higher than that at which auto-refrigerant freezing of the material occurs in the evacuated chamber, and means for removing from the vacuum chamber the water vapor given off by the material as it dries.

2. In apparatus of the class described for freeze-drying liquid materials in a highly evacuated chamber wherein the material is dried by auto-refrigerant freezing on moving conveyer-means arranged therein, the improvement which comprises the inclusion of means for applying the material to be dried as a liquid film on said conveying-means, and an enclosure surrounding said material application means, said enclosure having a series of metering orifices affording communication between the enclosure and the chamber through which gas may be withdrawn during the evacuation of the chamber and through which water vapor evolved from the material in the enclosure may escape at a controlled rate during the application of material to the enclosure, said communicating orifices operating in series to maintain within the enclosure a substantially constant pressure greater than that in the chamber by an amount sufficient to prevent freezing of the material in the enclosure.

3. In apparatus for freeze-drying liquid materials in a highly evacuated chamber wherein the material is dried on moving conveyer-means arranged therein, the improvement which comprises means for applying the material to be dried as a film on said conveyer-means, an enclosure surrounding said material application means and a portion of said conveyor, and communicating means between the enclosure and the chamber for maintaining within said enclosure a reduced pressure greater than that within the chamber to prevent freezing of the material on the conveyer-means until the material is subjected to the high vacuum existing in the chamber, said communicating means including a series of orifices arranged to produce the desired pressure drop through the passage of water vapor liberated from the material in the enclosure.

4. Apparatus as set forth in claim 3, characterized by the fact that the orifices are spaced apart by surge chambers, in which the escaping water vapor may become turbulent, thereby building up pressure in back of each orifice.

5. In a freeze-drying apparatus, a housing constituting a vacuum chamber, a conveyer arranged in said housing to convey material being dried, evacuating apparatus operatively connected and arranged to exhaust said vacuum chamber so that the residual gas pressure and the pressure of water vapor liberated from the material is less than the pressure corresponding to the freezing point of the material and is of the order of one mm. Hg absolute, an applicator adapted and arranged to apply to said conveyor a film of liquid material to be dried, and an enclosure enclosing said applicator and the contiguous portion of said conveyer, said enclosure presenting a series of metering orifices through which said conveyer conveys the film of liquid material sequentially from said enclosure into said vacuum chamber for freezing and drying, said series of metering orifices being of such vapor passing capacity as to permit the escape of vapor evaporated from said material in said enclosure while maintaining within said enclosure a vapor pressure substantially higher than that of the chamber and of the order of 6 mm. Hg absolute, whereby liquid material within said enclosure is evaporated while maintained at a temperature above its freezing temperature to facilitate its application to said conveyer for movement thereon into said freezing and drying vacuum chamber.

6. In a freeze-drying apparatus, a housing constituting a vacuum chamber, a conveyer arranged to operate within said housing for conveying material being dried, evacuating apparatus operatively connected and arranged to establish within said housing a vacuum sufficiently high to effect auto-refrigerant freezing of the material to be dried, an applicator adapted and arranged to apply to said conveyer a film of liquid material to be dried, and an enclosure enclosing said applicator and the contiguous portion of said conveyer, said enclosure presenting a series of metering orifices with surge chambers between them through which said conveyer conveys the film of liquid material from said enclosure into said vacuum chamber for freezing and drying, said series of metering orifices and intervening surge chambers being of such vapor passing capacity as to permit the escape of vapor evaporated from said material in said enclosure while maintaining within said enclosure a vapor pressure higher than that at which auto-refrigerant freezing of the material occurs, whereby liquid material within said enclosure is maintained at a temperature above its freezing temperature to facilitate its application to said conveyer for movement thereon into said vacuum chamber as a liquid film prior to freezing therein.

7. The method of freeze-drying material on a moving conveyer that comprises, subjecting liquid material to be dried to a vacuum not sufficiently great to effect auto-refrigerant freezing thereof the vacuum being of the order of 6 mm. Hg absolute to effect a partial drying action without freezing the material, applying the liquid material to the moving conveyer in the form of a thin film while subjected to the non-freezing vacuum, then subjecting the film of material as it advances on the conveyer to successive progressively increasing degrees of vacuum culminating in a vacuum sufficiently great to effect auto-refrigerant freezing thereof the final vacuum being of the order of one mm. Hg absolute to freeze-dry it, and then removing the dried material from the conveyer.

HOWARD O. McMAHON.

REFERENCES CITED

The following references are of record in the file of this patent:

UNITED STATES PATENTS

| Number | Name | Date |
|---|---|---|
| 1,200,116 | Johnson et al. | Oct. 3, 1916 |
| 2,087,788 | Thal | July 20, 1937 |
| 2,100,151 | Tietz | Nov. 23, 1937 |
| 2,396,561 | Flosdorf | Mar. 12, 1946 |
| 2,400,748 | Flosdorf | May 21, 1946 |
| 2,411,152 | Folsom | Nov. 19, 1946 |
| 2,528,476 | Roos et al. | Oct. 31, 1950 |

FOREIGN PATENTS

| Number | Country | Date |
|---|---|---|
| 883,178 | France | Mar. 15, 1943 |

OTHER REFERENCES

"Research Reports on Quartermaster Contract Projects from July 1, 1944, through June 30, 1945, and July 1, 1945, through October 31, 1945". Massachusetts Institute of Technology, Food Laboratory Reports. Pages 180, 181 Main Section. Section I, pages 2, 3, sheet S-6 and sheet S-12.

"A Method for the Production of Dry Powdered Orange Juice," by J. C. Sluder et al., Food Technology; vol. 1, No. 1, January 1947, pages 85 to 94.